April 10, 1962   S. L. LEACH   3,028,785
APPARATUS FOR FACILITATING THE REPRODUCTION OR
ENLARGEMENT OF LENTICULATED PHOTOGRAPHS
Filed Oct. 12, 1960   2 Sheets-Sheet 2
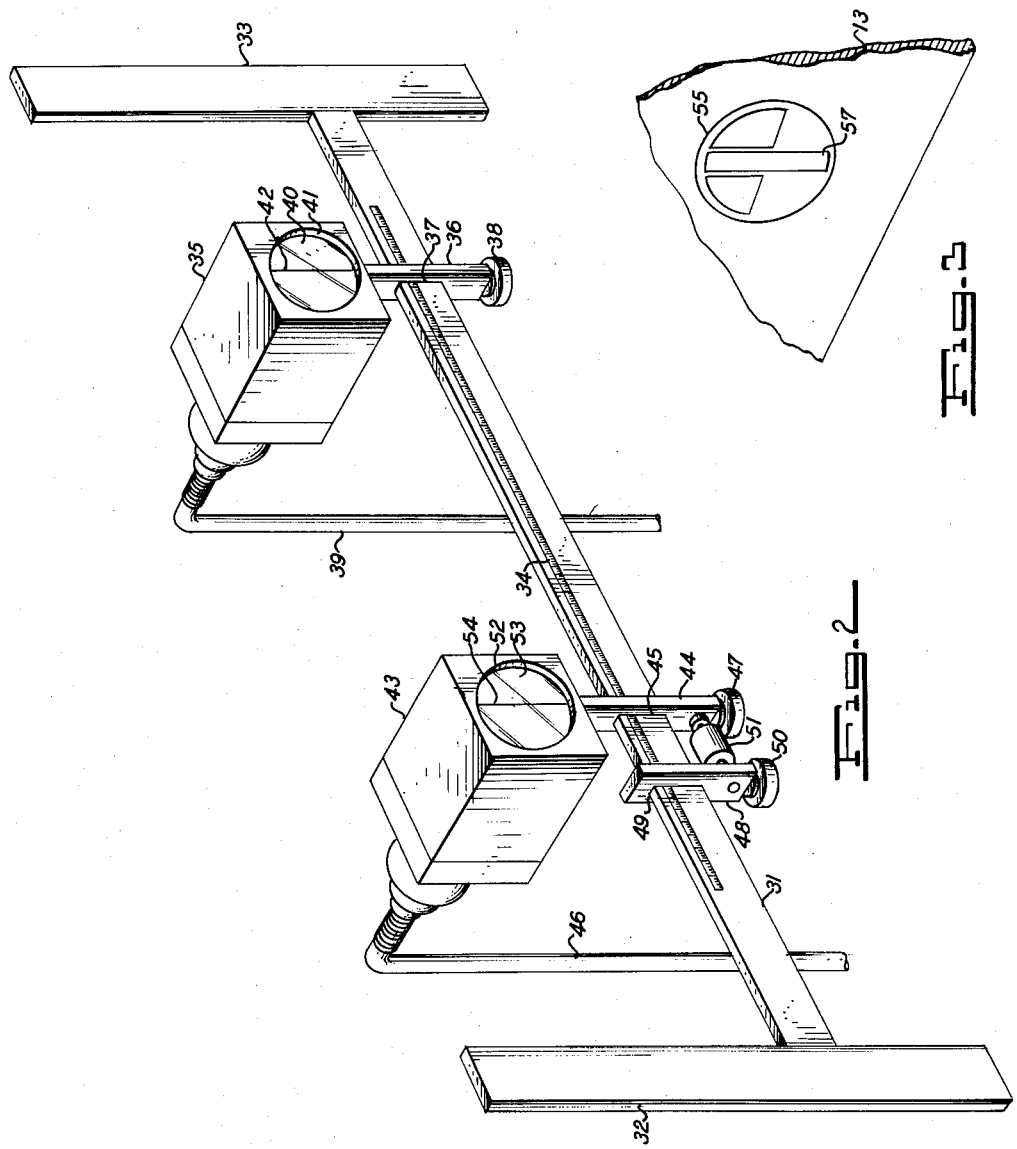
INVENTOR
SAM L. LEACH
BY Jacobi & Jacobi
ATTORNEYS

United States Patent Office 3,028,785
Patented Apr. 10, 1962

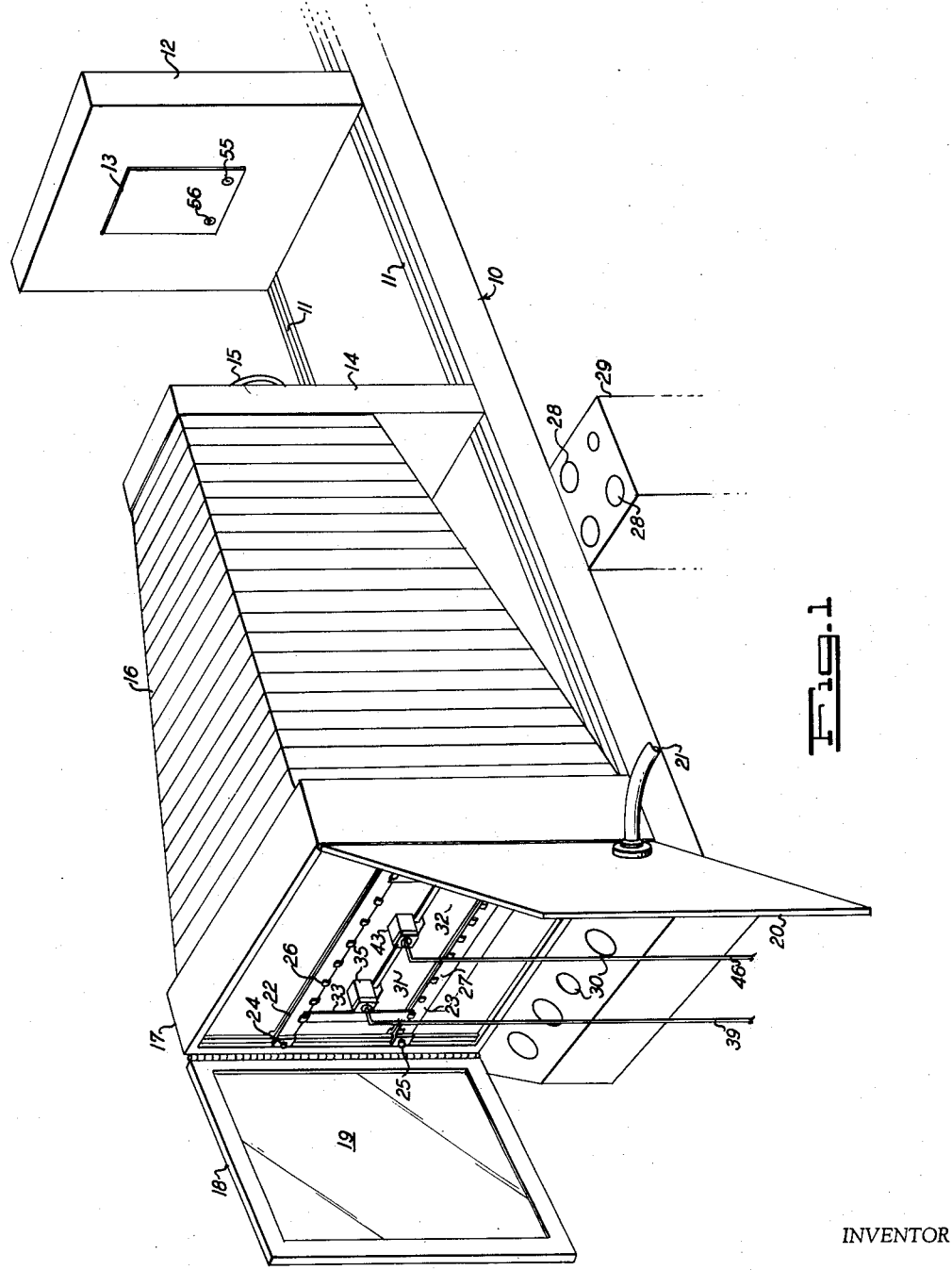

3,028,785
APPARATUS FOR FACILITATING THE REPRODUCTION OR ENLARGEMENT OF LENTICULATED PHOTOGRAPHS
Sam L. Leach, Owensboro, Ky., assignor to Pid Corporation, Beverly Hills, Calif., a corporation of California
Filed Oct. 12, 1960, Ser. No. 62,130
5 Claims. (Cl. 88—24)

This invention relates to photography and more particularly to an apparatus for facilitating the reproduction or enlargement of lenticulated photographs.

The apparatus of this invention is intended to be utilized with photographs for providing a stereoscopic or three dimensional effect and the photographs with which we are here concerned are produced by photographing the desired subject through a lenticular screen having suitable optical characteristics, the lenticular screen being essentially a plurality of parallel lenses of suitable optical characteristics arranged in a flat plane or in the form of a screen and the resulting photograph contains contiguous right and left hand images of the subject photographed and viewing of the photograph through a lenticular screen having the same characteristics as the screen through which the photograph was taken results in providing a stereoscopic or three dimensional effect. In this application the term "lenticulated photograph" is to be understood to mean a photograph taken through a lenticular screen in the manner set forth above.

Obviously, it is impractical to provide original photographs of sufficient size for all commercial uses and frequently it is desired to enlarge such photographs to provide relatively large prints for advertising, display purposes or the like.

Serious problems are encountered in the enlargement of lenticulated photographs, in that the degree of enlargement and proper focusing are not the only factors to be considered. In addition to these factors, the relationship between the effective lenticle spacing on the original lenticulated photograph and the effective lenticle spacing on the enlargement must be properly and accurately maintained which means that the copying or processing camera utilized to produce the enlarged photograph must be properly adjusted to maintain an accurate relationship between the degree of enlargement and the effective lenticle spacing. Failure to maintain this relationship will result in the production of an inferior photograph which will not provide a proper stereoscopic or three dimensional representation.

The apparatus of this invention permits the proper adjustment of a copying camera to accurately reproduce a lenticulated photograph to an enlarged scale and with the lenticulated areas of the enlarged reproduction exactly coinciding with the lenticulated areas of the original and this apparatus and process also facilitates proper focusing of the camera to produce a sharp image on the enlargement.

It will be seen that some such apparatus and process is necessary for the satisfactory reproduction of enlarged lenticulated photographs, since in the event the lenticulated areas of the enlarged photograph do not coincide with the lenticulated areas of the original photograph when viewing the enlarged photograph through a lenticular screen, the lenticulated areas would not coincide exactly with the lenticles of the lenticular screen and consequently, the resulting image as seen by the viewer would be materially distorted and would not be satisfactory from a commercial standpoint.

It is accordingly an object of the invention to provide an apparatus for facilitating the reproduction or enlargement of lenticulated photographs which may be utilized on conventional copying or processing cameras without modification of such cameras.

A further object of the invention is the provision of an apparatus for facilitating the reproduction or enlargement of lenticulated photographs, which apparatus may be mounted on a conventional copying camera and which will provide means for properly focusing and adjusting the camera to provide an enlarged lenticulated photograph having the identical characteristics of the original photograph to be copied.

A still further object of the invention is the provision of an apparatus for facilitating the reproduction or enlargement of lenticulated photographs which involves the use of projection means mounted on the copying camera in the film plane thereof for projecting index marks through the taking lens of the camera and onto the photograph to be copied, there being reference marks provided on the photograph to be copied and upon registration of the index marks with the reference marks, the camera will be properly adjusted and focused to provide the desired enlargment.

Another object of the invention is the provision of an apparatus for facilitating the reproduction or enlargement of lenticulated photographs, which apparatus comprises an optical projection assembly which may be conveniently installed in a copying camera and removed therefrom and in which the projection apparatus may be conveniently and accurately adjusted for any desired degree of enlargement within the limits of the camera.

A further object of the invention is the provision of an apparaatus for facilitating the reproduction or enlargement of lenticulated photographs, which apparatus may be conveniently and economically constructed from readily available materials and which may be utilized with conventional copying cameras without modification thereof.

Another object of the invention is the provision of apparatus for facilitating the reproduction or enlargement of lenticulated photographs which involves the provision of reference marks on the photograph to be copied, the spacing between such marks being accurately related to the effective spacing of the lenticles of the lenticular screen through which the photograph was taken and in which the copying camera is so adjusted by use of the reference marks and optically projected index marks as to provide a corresponding effective lenticular spacing for the enlarged photograph to be produced in the camera.

Further objects and advantages of the invention will be apparent from the following description taken in conjunction with the accompanying drawings wherein:

FIG. 1 is a fragmentary view in perspective showing a conventional copying camera with the apparatus of this invention installed therein and with a lenticulated photograph in place on the easel of the camera preparatory to adjusting the camera and making an enlargement thereof;

FIG. 2 a view in perspective showing the apparatus of this invention and the mechanism provided for adjusting the same for varying degrees of enlargement; and FIG. 3 a fragmentary view in perspective to an enlarged scale and showing the nature of the reference marks provided on the original lenticulated photograph which is to be copied.

With continued reference to the drawings, there is shown in FIG. 1 a portion of a conventional copying or processing camera and which may well comprise a base 10 having rails 11 on the upper surface thereof for slidably supporting an easel 12 having means, not shown, for securing thereto a photograph 13 or other object to be photographed by the camera. Also slidably mounted on the rails 11 of the frame 10 is a lens board 14 for supporting the desired taking lens 15 and, of course, lenses of various focal lengths and other characteristics may be provided and the lens best suited for the particular purpose at hand will be selected and installed on the lens board 14. The lens board 14 is connected by a light tight bellows 16 with the camera back 17 and while in normal installations of this type the rear of the camera back 17 opens into a dark room, such an installation is not necessary and has no bearing on the instant invention.

Pivotally mounted on the camera back 17 and swingable into the film plane is a door 18 having a ground glass 19 therein for viewing and focusing purposes and also swingably mounted on the camera back 17 and swingable into the film plane is a film carrier in the form of a door 20 which is provided with suitable means on the inner face thereof connected through a conduit 21 to a source of vacuum for firmly retaining a photographic film on the inner surface of the door 20 and it is to be understood that the door 20 with a film mounted on the inner surface thereof will be swung into the film plane of the camera when it is desired to take a picture.

Also mounted in the camera back 17 for vertical sliding movement are upper and lower cross bars 22 and 23 and such cross bars may be set in adjusted position by set screws 24 and 25 or by other suitable means. The cross bars 22 and 23 also carry clips 26 and 27 respectively which may be utilized for securing any desired accessories therebetween and such clips are utilized for temporarily securing the apparatus of this invention in place in the camera back and in the film plane of the camera. The camera may also be provided with suitable controls and indicators 28 mounted on a control box 29 secured to the frame 10 and for convenience of operation, such controls may also be duplicated as shown at 30 on the rear of the camera back 17 and within the dark room if such an installation is utilized. All of the above camera features which have been described are conventional and are found in copying or processing cameras of the type utilized in connection with the apparatus and method of this invention and, of course, these features form no part of the instant invention, but are described for the purpose of disclosing an apparatus with which the present invention is utilized and also in order to facilitate an understanding of the structure and use thereof.

With particular reference to FIG. 2, there is shown an apparatus constructed in accordance with this invention and which may well comprise an elongated bar 31 provided on the opposite end thereof with angularly related bars 32 and 33 which are utilized to facilitate removably securing the apparatus of this invention in the film plane of the camera above described. The bar 31 is provided with calibrations 34 which correspond to the effective lenticle spacing of the lenticular screen through which the lenticulated photograph to be copied was taken and the calibrated scale 34 permits adjustment of the apparatus of this invention to provide the required degree of enlargement and to accurately relate the same to the effective lenticle spacing of the photograph to be copied.

A lamp housing 35 is slidably mounted on the bar 34 adjacent one end thereof by means of a rod 36 having a slot 37 therein for receiving the bar 31 and the lamp housing 35 may be secured in adjusted position on the bar 31 by means of a set screw 38 threadedly received in the bar 36 and engaging the bar 31. A suitable light source, not shown, is provided in the lamp housing 35 and such light source may be connected through a conductor 39 with an electrical source for energizing the light source within the housing 35. A screen 40 is mounted in an opening 41 in the front wall of the lamp housing 35 and an index mark 42 is provided on the screen 40. The screen 40 may be of glass or other suitable material and such screen may be transparent or translucent, in which case the index mark 42 could be in the form of a wire or other opaque substance or in the event the screen 40 is opaque, the mark 42 could be in the form of a transparent line on the screen 40.

A second lamp housing 43 is carried by a rod 44 having a slot therein 45 slidably receiving the bar 31 and the lamp housing 43 is provided with a suitable light source, not shown, connected through a conductor 46 to a source of electricity. The rod 44 is provided with a set screw 47 for engaging the bar 31 to securely lock the lamp housing 43 in adjusted position. In order to permit extremely accurate adjustment of the lamp housing 43 on the bar 31 there is provided a vernier mechanism in the form of a slide 48 having a slot 49 therein slidably receiving the bar 31 and the slide 48 is provided with a set screw 50 for engaging the bar 31 to securely lock the slide 48 in place thereon. Finger operated screw threaded means 51 is connected between the slide 48 and the rod 44 on the lamp housing 43 in such a manner that rotation of the member 51 in one direction will tend to urge the rod 44 and slide 48 apart and rotation of the member 51 in the opposite direction will tend to pull the rod 44 and slide 48 toward each other. In operation, the rod 44 is moved to a position on the bar 31 adjacent the desired calibration on the scale 34 and at that time the slide 48 is locked to the bar 31 by the set screw 50. Thereafter, the member 51 is manipulated to move the slide 44 to the exact position desired on the bar 31 as indicated by the scale 34 and upon completion of this adjustment the set screw 47 is utilized to lock the rod 44 and lamp housing 43 in adjusted position on the bar 31.

The lamp housing 43 is provided with an opening 52 in the front face thereof and mounted in such opening is a screen 53 having an index mark 54 thereon. The screen 53 and index mark 54 are of the same character as the corresponding screen 40 and index mark 42 installed in the lamp housing 35 and above described in detail. Consequently, no further detailed description of the screen 53 and index mark 54 is believed necessary.

In order to utilize the apparatus and method of this invention, the lenticulated photograph 13 to be copied must be provided with spaced reference marks 55 and 56 thereon and such reference marks are accurately spaced in accordance with the lenticle spacing of the screen through which the photograph 13 was taken. In other words, the reference mark 55 will be in exact alignment with one of the lenticles adjacent one edge of the picture 13 and the reference mark 56 will be in exact alignment with a lenticle adjacent the opposite edge of the photograph 13 and the number of lenticles between the reference marks 55 and 56 will be known. With particular reference to FIG. 3, an enlarged view of one of the reference marks on the photograph 13 is shown and as seen from this FIGURE, the reference mark 55 may be circular in form and may be provided with a central reference slot 57 therein and the width of such slot will be of the order of four one thousandths of an inch although this width is not critical. The slot 57 in each of the reference marks 55 and 56 is utilized during adjustment and focusing of the camera in a manner to be presently described and the slot 57 is related to the index marks 42 and 54 on the screens 40 and 53 of the lamp housings 35 and 43 and the width of the index marks 42 and 54 may be of the order of three one thousandths of an inch, although in a similar manner this dimension is not critical, but to a certain extent is related to the width of the slots 57 in the reference marks 55 and 56.

In the operation of the apparatus and method of this invention, the doors 18 and 20 on the back 17 of the camera are opened as shown in FIG. 1, and the apparatus of this invention is installed in the back 17 by securing the end members 32 and 33 on the bar 31 in place by means of the clips 26 and 27 on the cross bars 22 and 23, it, of course, being understood that such cross bars have heretofore been secured in proper adjusted position to accommodate the end members 32 and 33. In this position, the screens 40 and 53 in the lamp housings 35 and 43 are disposed accurately in the film plane of the camera. The lenticulated photograph 13 to be copied is secured to the easel 12 and the degree of enlargement is determined and the spacing between the lamp housings 5 and 43 adjusted in accordance with such degree of enlargement, it being understood that the spacing between the index marks 42 and 54 will be equal to the number of lenticles between the reference marks 55 and 56 on the photograph 13 multiplied by the degree of enlargement desired. In this manner, the spacing between the index marks 42 and 54 will accurately correspond to the lenticle spacing on the enlarged photograph and with reference to the lenticle spacing on the photograph 13 to be copied.

With the spacing between the index marks 42 and 54 accurately adjusted and with the apparatus in place in the film plane of the camera the light sources in the lamp housings 35 and 43 are energized resulting in optically projecting an image of the index marks 42 and 54 through the taking lens 15 of the camera and onto the surface of the photograph 13 to be copied. All that remains to be accomplished is the proper adjustment of the easel 12 and lens board 14 to bring the projected images of the index marks 42 and 54 into exact registry with the slots 57 in the reference marks 55 and 56 on the picture 13 and when such projected images are in exact registry with the slots 57 and are also sharply focused therein, the camera will be properly adjusted to provide an accurate and satisfactory reproduction or enlargement of the lenticulated photograph 13. Upon completion of this adjusting operation, the apparatus in the form of the lamp housings 35 and 43 and supporting structure are removed from the camera back 17 and a suitable film carried by the door 20 is swung into position in the film plane and a photograph of the picture 13 is made by subjecting the same to proper exposure. As many copies as desired may be made with this setting of the camera, but in the event the degree of enlargement must be changed, the apparatus is again installed in the camera back 17 and the operation above described, is repeated.

By the use of proper lenses 15 on the lens board 14 a copy of the same size as the original photograph 13 may be made or, if desired, a reduction thereof may be made and proper registration between the lenticles of the original and the lenticles of the reproduction will be provided whether the resulting photograph be a reduction, the same size as the original or an enlargement.

It will be obvious that by the above described invention there has been provided a relatively simple, yet highly effective apparatus and method for properly adjusting a copying camera to provide a suitable and commercially acceptable copy of a lenticulated photograph and one, which when viewed through a suitable lenticular screen, will provide a sharp and satisfactory three dimensional or stereoscopic picture.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An apparatus for facilitaing the reproduction or enlargement of lenticulated photographs, said apparatus comprising an elongated bar, means for mounting said bar in the film plane of a copying camera, calibrations on said bar corresponding to the effective lenticle spacing of the lenticular screen through which the lenticulated photograph was taken, a lamp housing slidably mounted on said bar adjacent one end, means to fix said housing in adjusted position on said bar, a light source in said housing, a screen mounted in said housing, an index mark on said screen, a second lamp housing slidably mounted on said bar, vernier means for adjusting the position of said second housing on said bar in accordance with said calibrations, means to fix said second housing in adjusted position on said bar, a light source in said second housing, a screen mounted in said second housing and an index mark on said last named screen, whereby upon illumination of said index marks by said light sources, said marks will be projected through the lens of said camera to provide spaced images on a lenticulated photograph to be copied mounted on the easel of said camera, alignment and focusing of said images on reference marks on said photograph spaced a given number of lenticles resulting in proper lenticular registration and focusing for a given reproduction or enlargement to be made by said camera.

2. An apparatus for facilitating the reproduction or enlargement of lenticulated photographs, said apparatus comprising an elongated bar, means for mounting said bar in the film plane of a copying camera, calibrations on said bar corresponding to the effective lenticle spacing of the lenticular screen through which the lenticulated photograph was taken, a lamp housing mounted on said bar adjacent one end, a light source in said housing, a screen mounted in said housing, an index mark on said screen, a second lamp housing slidably mounted on said bar, vernier means for adjusting the position of said second housing on said bar in accordance with said calibrations, means to fix said second housing in adjusted position on said bar, a light source in said second housing, a screen mounted in said second housing and an index mark on said last named screen, whereby upon illumination of said index marks by said light sources said marks will be projected through the lens of said camera to provide spaced images on a lenticulated photograph to be copied mounted on the easel of said camera, alignment and focusing of said images on reference marks on said photograph spaced a given number of lenticles resulting in proper lenticular registration and focusing for a given reproduction or enlargement to be made by said camera.

3. An apparatus for facilitating the reproduction or enlargement of lenticulated photographs, said apparatus comprising an elongated bar, means for mounting said bar in the film plane of a copying camera, calibrations on said bar corresponding to the effective lenticle spacing of the lenticular screen through which the lenticulated photograph was taken, a lamp housing mounted on said bar adjacent one end, a light source in said housing, a screen mounted in said housing, an index mark on said screen, a second lamp housing slidably mounted on said bar, means to fix said second housing in adjusted position on said bar, a light source in said second housing, a screen mounted in said second housing and an index mark on said last named screen, whereby upon illumination of said index marks by said light sources said marks will be projected through the lens of said camera to provide spaced images on a lenticulated photograph to be copied mounted on the easel of said camera, alignment and focusing of said images on reference marks on said photograph spaced a given number of lenticles resulting in proper lenticular registration and focusing for a given reproduction or enlargement to be made by said camera.

4. An apparatus for facilitating the reproduction or enlargement of lenticulated photographs, said apparatus comprising an elongated bar, means for mounting said bar in the film plane of a copying camera, calibrations on said bar corresponding to the effective lenticle spacing of the lenticular screen through which the lenticulated photograph was taken, a lamp housing mounted on said bar adjacent one end, a light source in said housing, a screen mounted in said housing, an index mark on said screen, a second lamp housing slidably mounted on said bar, means for adjusting the position of said second housing on said bar in accordance with said calibrations, means to fix said second housing in adjusted position on said bar, a light source in said second housing, a screen mounted in said second housing and an index mark on said last named screen, whereby upon illumination of said index marks by said light sources said marks will be projected through the lens of said camera to provide spaced images on a lenticulated photograph to be copied mounted on the easel of said camera, alignment and focusing of said images on reference marks on said photograph spaced a given number of lenticles resulting in proper lenticular registration and focusing for a given reproduction or enlargement to be made by said camera.

5. An apparatus for facilitating the reproduction or enlargement of lenticulated photographs, said apparatus comprising an elongated bar, means for mounting said bar in the film plane of a copying camera, calibrations on said bar corresponding to the effective lenticle spacing of the lenticular screen through which the lenticulated photograph was taken, means on said bar adjacent one end for projecting an index mark through the lens of the camera, adjustable means adjacent the opposite end of said bar for projecting a second index mark through the lens of the camera, means to fix said last named means in adjusted position, whereby images of said index marks will be projected on a lenticulated photograph to be copied mounted on the easel of said camera, alignment and focusing of said images on reference marks on said photograph spaced a given number of lenticles resulting in proper lenticular registration and focusing for a given reproduction or enlargement to be made by said camera.

No references cited.